Jan. 16, 1968
C. F. KENNEDY ETAL
3,363,442
TUBE TAPERING DEVICE
Filed May 25, 1965
4 Sheets-Sheet 2
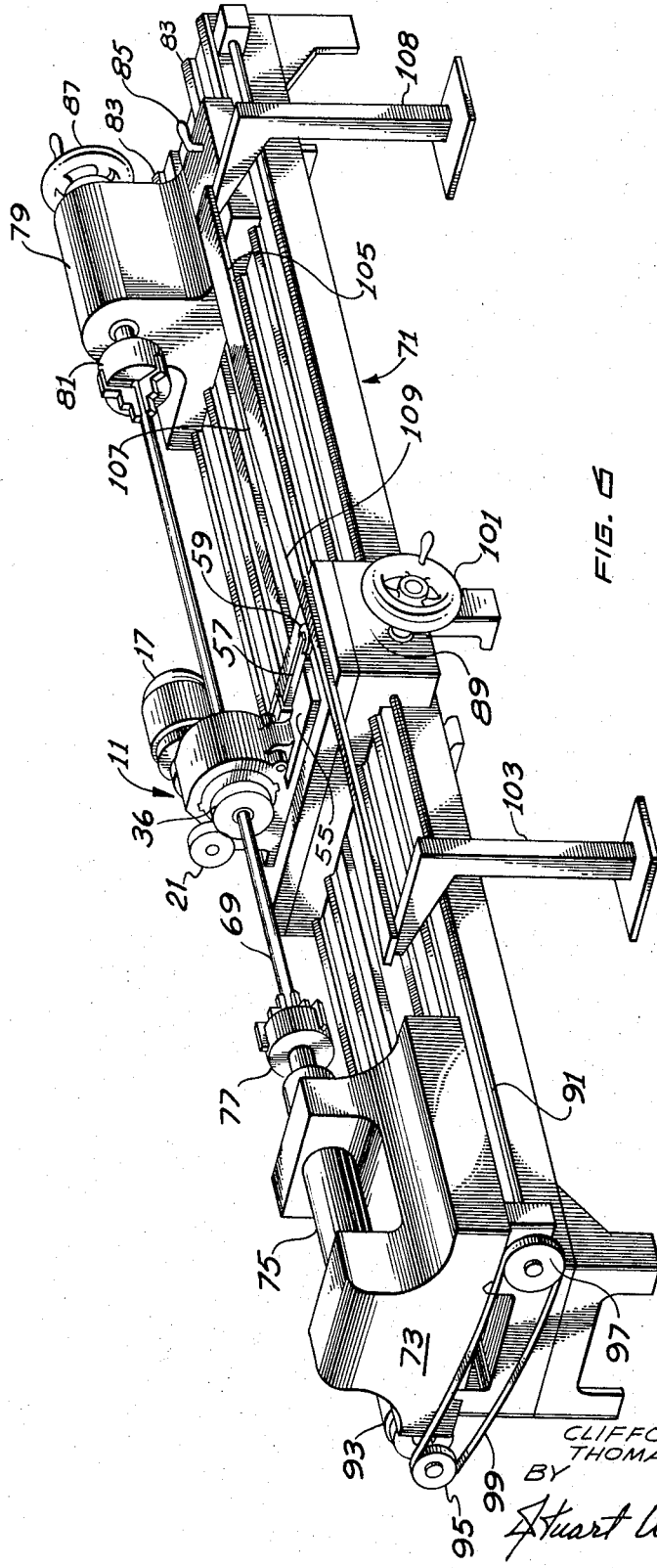
INVENTORS.
CLIFFORD F. KENNEDY
THOMAS M. SHELTON
BY
Stuart W. Wohlgemuth
ATTORNEY INVENTORS.
CLIFFORD F. KENNEDY
THOMAS M. SHELTON
BY
Stuart W. Wohlgemuth
ATTORNEY Jan. 16, 1968  C. F. KENNEDY ETAL  3,363,442
TUBE TAPERING DEVICE Filed May 25, 1965  4 Sheets-Sheet 4

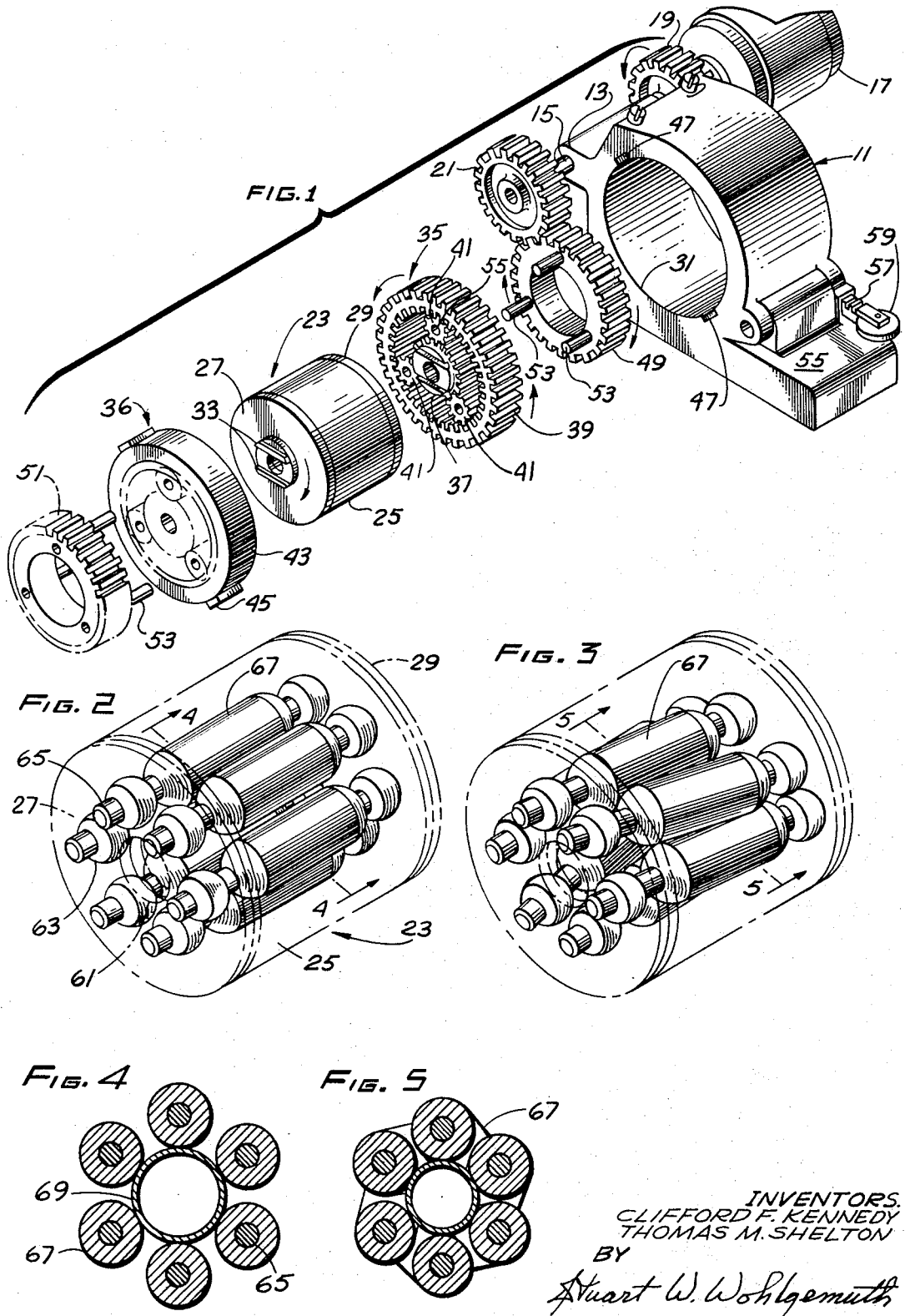

INVENTORS.
CLIFFORD F. KENNEDY
THOMAS M. SHELTON
BY
Stuart W. Wohlgemuth
ATTORNEY United States Patent Office 3,363,442
Patented Jan. 16, 1968

3,363,442
TUBE TAPERING DEVICE
Clifford F. Kennedy, Simi, and Thomas M. Shelton, Glendale, Calif., assignors to North American Aviation, Inc.
Filed May 25, 1965, Ser. No. 458,553
11 Claims. (Cl. 72—123)

ABSTRACT OF THE DISCLOSURE

A variable draw die apparatus for tapering workpieces such as tubes, rods and the like. A plurality of circularly aligned and coextensive axles carrying roller dies define a central space constituting a die orifice. The opposite ends of the axles extend into a pair of spaced circular plates which are centrally apertured to accommodate passage of the workpiece. The relative positions of the plates are adjustable to vary the die orifice.

This invention relates to a means for tapering metal tubing. More specifically, the invention relates to a chuck device wherein a tube passing therethrough can be selectively tapered.

Prior to the herein invention, several devices have been utilized for the tapering of metal tubing. Due to the configuration of the dies or chuck used in these prior methods, the degree of reduction per pass of a tube was severely limited either as to size or as to working of the metal. Usually a tube in the prior art would have to be annealed between each successive pass through a tapering chuck since the chuck severely worked the metal. Often the pressure applied to the tubes for tapering purposes was at two points 180° apart, thus squeezing the tube at a given point yet permitting the metal to give at the points where no contact existed between the dies used in the tube. This often severely warped the metal causing cracks and the like as well as necessitating the annealing previously mentioned.

Thus, an object of this invention is to provide a tube tapering chuck wherein a great range as to the effect of diameter of the taper can be achieved without changing any of the parts within the chuck.

Another object of this invention is to provide a tube tapering chuck wherein more than two points of contact exist about the tube being tapered. Thus, decreasing the amount of work done upon the tube at any one point during the tapering thereof.

The above and other objects of the invention are accomplished by the device of the herein invention which comprises a cylindrical housing having enclosed ends. An aperture is provided in each end portion whereby a tube to be tapered can be admitted to pass through the cylinder at its axis. One end of the housing is rigidly affixed thereto while the other opposite end is slidable or rotatable with relation to the housing. A plurality of rotatable axes are disposed circumferentially about the apertures of each end. The axles are affixed to one end of the housing while extending through and in slidable engagement with the second opposite end of the housing. This permits, as will be explained with relationship to the description of the drawings, the axles to twist when the rotatable end of the housing is rotated with relation to the fixed end of the housing. Disposed on the axles are rollers which grip the tubing passing through the housing. The rollers selectively taper the tubing by the movement of the rotatable end of the housing, as previously mentioned, so as to twist the supporting axles. In one embodiment of the invention the rollers are disposed within the housing. In the second embodiment of the invention, as disclosed, the rollers are disposed on ends of axles which extend through the end of the housing and are mounted outside the housing. In this second embodiment, the previously described rotatable end of the housing may be additionally moveable in an axial direction whereby further control over the axles and their relative position to the tube passing through the housing can be obtained. It is believed that the invention will be better understood in the following detailed description with relation to the drawings in which:

FIG. 1 is an exploded pictorial representation of a first embodiment of the invention.

FIG. 2 is a pictorial representation of the first embodiment showing in detail the roller configuration.

FIG. 3 discloses essentially the same as FIG. 2, particularly disclosing displacement of the rollers upon rotation of one end of the device to the other.

FIG. 4 is a cross-sectional view of the rollers about a tube taken along lines 4—4 of FIG. 2.

FIG. 5 is a cross-sectional view of the rollers compressed about a tube taken along lines 5—5 of FIG. 3.

FIG. 6 is a pictorial representation of an entire machine for tube tapering incorporating the tube tapering chuck of the invention.

Figure 7:
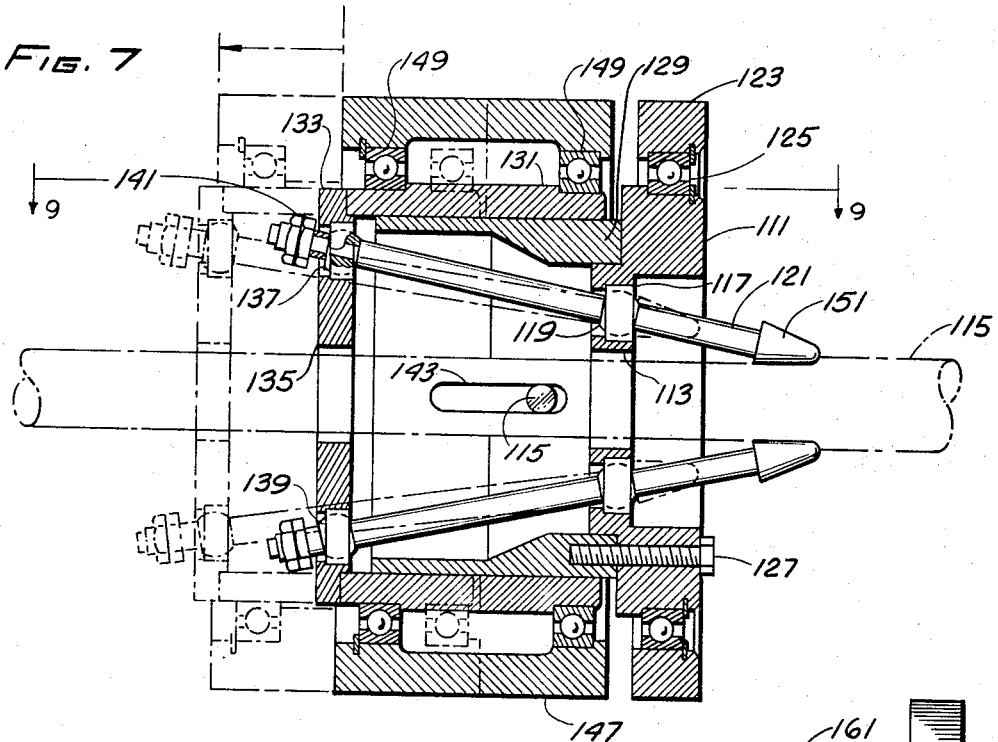

FIG. 7 is a cross-sectional plan view of the chuck of the second embodiment of the invention.

Figure 8:
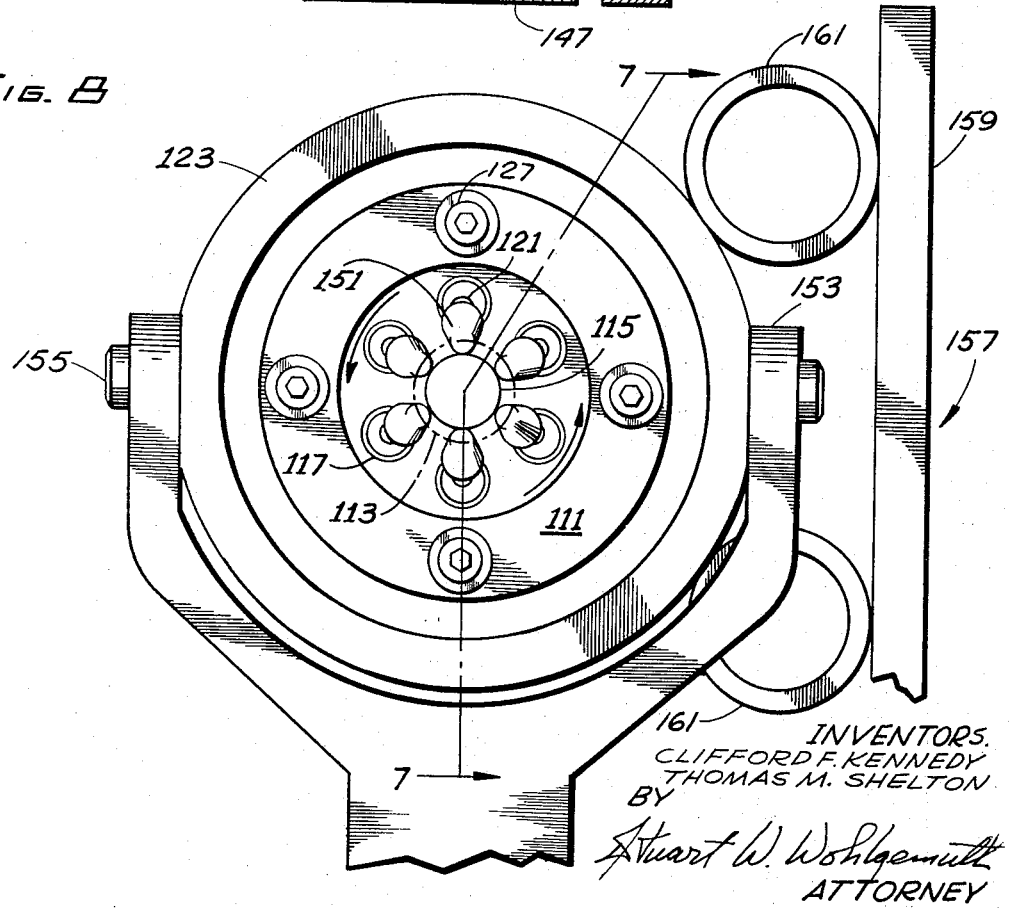

FIG. 8 is a front view taken along lines 8—8 of FIG. 7.

Figure 9:
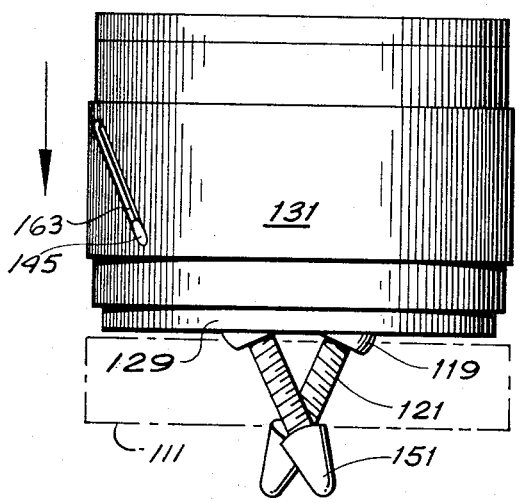

FIG. 9 is a top view of the device of the second embodiment showing the rollers in a closed position.

Figure 10:
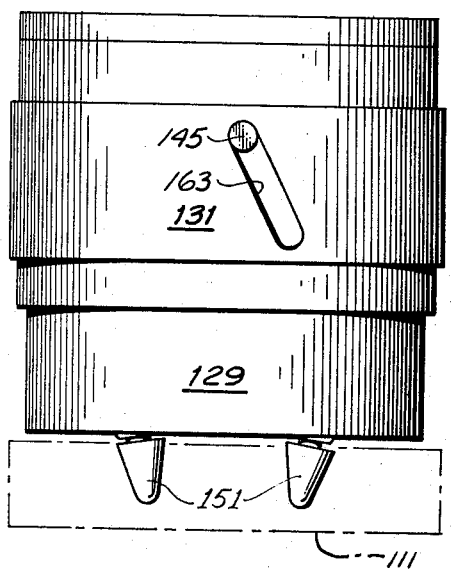

FIG. 10 is a top view like FIG. 9 showing the rollers in an open position.

Figure 11:
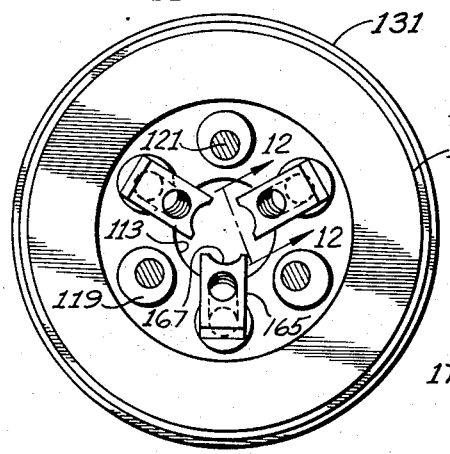

FIG. 11 is a front view of the chuck of FIG. 7 showing a different roller configuration.

Figure 12:
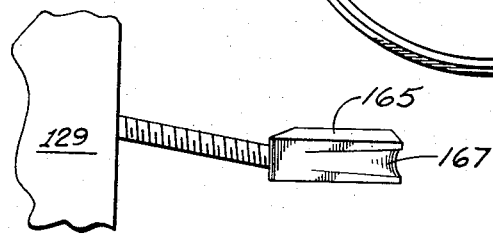

FIG. 12 is a detailed view of the particular rollers used in FIG. 11.

Figure 13:
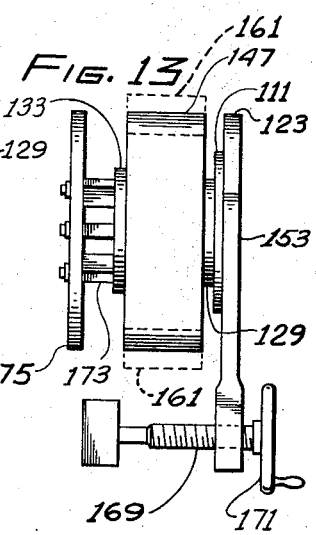

FIG. 13 is a simplified pictorial representation of a means for controlling the movement of the chuck of the second embodiment.

Referring now to FIG. 1 there is shown an assembly of the chuck and drive means for controlling the movement of the rollers in the chuck. Disclosed is an outer housing 11 having an extension 13 through which an axle 15 passes. The axle is driven by a motor 17 which serves to additionally drive two gears 19 and 21 disposed respectively on each side of the housing 11. The tube tapering chuck 23 has an outer cylindrical housing 25 having substantially closed ends 27 and 29. The diameter of the housing 25 of the chuck corresponds to the inner diameter of the aperture 31 provided in the outer housing 11. Thus the chuck 23 fits within the outer housing 11. On each outside end of chuck 23 are disposed two parallel ridges 33 which serve as a key. Adjoining each end of the housing 25 are gear arrangements. The gear arrangements at each end of the housing are essentially the same with only a slight difference between the two ring gears utilized, as will be explained. At the center of the gearing arrangements 35 is a sun gear 37 having two slots herein corresponding to the ridges 33 at the ends of the housing 25. Thus the sun gears are locked by this means to the housing such that rotation of the sun gear will cause the relative movement of the housing. Formed concentrically about the sun gear 37 and having the same outer diameter as the housing 25 is a ring gear 39 having teeth on both the interior and outside diameter as shown. Disposed between the ring gear and sun gear 37 are three planetary gears 41 which serve to connect the sun gear to the ring gear. The difference between the gear arrangements 35 and 36 resides in the fact that the gear arrangement 36 has no teeth on the outside diameter of its ring gear 43, but rather has a smooth surface corresponding to the outside diameter of the housing 25 as well as having two key portions or ridges 45 which fit within slots 47 provided in the housing 11. This obviously inhibits the rotation of the ring gear 43 within the housing 11. Thus both the housing 25 for the chuck and the gearing assemblies 35 and 36 all fit within the housing 11.

The chuck 23 and corresponding gear assemblies are driven by means of gears 49 and 51 disposed outside of the housing 11. The gears 49 and 51 have three cylindrical protrusions 53 which fit within center apertures 55 provided in each planetary gear. The gears 49 and 51 in turn are meshed with gears 91 and 21, respectively.

Disposed in the base portion 55 of the housing 11 on the side where the ring gear 39 is situated is a rack 57 which extends into the inner diameter 31 of the housing 11 at the periphery thereof so as to engage with the outer teeth of the ring gear 39. At the end of the rack 57 protruding from the housing 11 is a rotatable disc 59 for engagement with a template which will be later explained. Thus upon assemblage of the device of FIG. 1 the gears 19 and 21 drive respective gears 49 and 51 which in turn drive the planetary gears 41. Through the movement of the planetary gears upon the sun gears 37 the chuck 23 is thus rotated in a clockwise direction according to the arrow shown. The ring gear 36 is maintained stationary while the ring gear 35 exerts a continuous force against the rack 57. The movement of the rack 57 will cause relative displacement of ring gear 35. The ring gear 36 is affixed to the side 27 which is rigidly attached to the casing 25. Ring gear 35, however, is affixed to the side 29 of the housing 25 which is rotatable relative to the housing. Thus, in normal operation the sides 27 and 29 through the inner locking of the sun gears therewith rotate at the same relative speed. However, upon selective movement of rack 57 and its engagement with the outer periphery of ring gear 35 there is created a relative displacement of side 29 to side 27 of the housing 25. The effect of the additional relative displacement of one side to another will be explained with relation to the description of FIGS. 2 and 3.

Referring now to FIG. 2 there is shown the details of chuck assembly 23. Side 27, as previously mentioned, is rigidly affixed to the casing 23, while side 29 is in rotatable engagement therewith. A center aperture 61 is provided in each side. Through this aperture a tube which is to be tapered passes through the chuck. A plurality of spherical surfaced bearings 63 are equidistantly spaced circumferentially about the center aperture 61 in each side of the housing. By way of example six such bearings are shown in the figure. The bearings are seated within the respective sides and have freedom of rotary movement therein. A plurality of axles 65 extend through the bearings on one side to the corresponding ones on the other side. The axles are rigidly affixed to the bearings situated in side 29 and slidably extend into the bearings disposed in side 27.

In FIG. 2 the chuck is depicted wherein both sides 27 and 29 are situated relative to each other such that the axles are all parallel to the axis of the chuck. FIG. 3 depicts the position wherein the face 29 has been rotated through movement of the rack 57 shown in FIG. 1 such that the bearings disposed in face 29 are rotated relative to the bearings in face 27. Thus in this position due to the relative rotation it is now apparent that the distance on a given axle between the bearings on each face is increased. In order to permit the relative turning of the two faces the axle then must slip within the bearings of face 27. Mounted on each individual axle is a roller 67 affixed thereto. The rollers are constructed of metal, Teflon, nylon or other relatively durable material which can serve to work the metal tube. The rollers will rotate about their own axes due to the general rotary movement of the entire chuck device.

It should be pointed out that the particular details of the chuck are subject to variation. For example, the bearings in which the axles are slidable may be located on the moveable rotary face of the chuck 23, it making no difference with regard to this positioning. Additionally, though the device has been described wherein side 29 moves relative to the housing 25 of the chuck, this side may be rigidly affixed to the housing such that side 27 would be in slidable engagement. Thus, when face 29 is rotated due to movement of the rack 57, both the side and the housing 25 would move relative to side 27.

Referring now to FIGS. 4 and 5 there is shown in FIG. 4, for example, the disposition of the rollers 67 about a tube 69 passing therethrough. In this position no compression upon the tube exists. However, when the rollers have been rotated as shown in FIG. 3 compression of the tube occurs, as particularly depicted in the cross sectional view of FIG. 5. Due to the rotation of the rollers the effective diameter remaining between them is decreased so as to effect a taper.

FIG. 6 depicts a typical machine for tapering a tube incorporating the device of the invention. The basic machine utilized is not in itself novel but rather of relatively conventional design which further enhances the applicability of the novel tube tapering chuck of the invention. Thus, the particular configuration of the entire apparatus shown forms no part of the invention, but rather helps to illustrate the environment in which the novel tube tapering chuck is used. The apparatus shown comprises a base portion 71 having at one end a housing and support structure 73 which contains a pneumatic cylinder 75. The pneumatic cylinder 75 is affixed to a chuck 77 which holds one end of the tube 69 to be tapered. At the opposite end of the base 71 is located a second support structure 79 which serves to support a second chuck 81 which holds the opposite end of the tube. Since tubes of various lengths can be tapered on the machine the second support structure 79 is moveable along rails 83 provided on the top surface of the base 71. A rocking handle 85 locks the support structure 79 in place for a given length of tube. Additionally, for fine adjustment a wheel 87 is provided to properly tighten and adjust the chuck 81 for the tube. The pneumatic cylinder 75 acts to maintain a constant tension on the tube during the tapering operation so as to maintain a constant wall thickness in the final tube after tapering has occurred. The tube tapering roller assembly 11 is supported on a moveable carriage 89 which slides along the rails 83 between the chucks 77 and 81. The carriage 89 is driven by a worm screw 91 which in turn is rotated by motor 93 operating through pulleys 95 and 97 by means of a belt drive 99. If manual operation is desired, a hand wheel 101 is provided on the carriage for moving it along the tube. Two L-shaped supports 103 serve to hold a template member 105 in a plane parallel to the tube and as previously described, the force of the rotating gears of the tube tapering device serve to push the rack 57 having the rotary wheel 59 thereon against the template 105. Thus at the flat portion 107 of the template 105 no tapering of the tube is effected and the rollers are all parallel to the axis of the tube. However, in the portion of the template that is curved, 109, the movement of the rack 57 outward causes, as previously explained, a rotation of one side of the housing containing the rollers, thus rotating the rollers relative to each other and to the tube. This narrows the effective diameter between the rollers to taper the tube.

Referring now to FIG. 7 there is shown a second embodiment of the invention incorporating the principle of operation of the described device. In this embodiment relatively small frusto-conically shaped rollers are shown outside of the main housing containing the axle elements as will be explained. Shown is a front plate 111 which has a center aperture 113 therein through which the tube 115 can pass as it is being worked. Disposed circumferentially about the aperture 113 in the plate are housings or small openings 117 which contain spherical bearings 119. An axle 121 is in slidable engagement with the bearing 119. Disposed circumferentially about the entire front plate 111 is an outer race 123 separated from the plate 111 by a plurality of ball bearings 125. Thus the outer race 123 can rotate about the plate 111 on the bearings 125. The front plate 111 is affixed by a plurality of bolts 127 to a cylindrical housing 129. Tight fitted and in slidable engagement with housing 129 is an outer casing 131. Cylindrical casing 131 has a rear plate 133 affixed thereto. The plate 133 corresponds to the front plate 111 and has a center aperture 135 therein to permit passage of the tube 115. Additionally, a plurality of bearings 137 are provided in apertures 139 in the plate in a similar manner to that shown on front plate 111. As shown in the cross section of the bearing 133, the aperture 134 in the bearing wherein the axle 129 passes is of smaller diameter than the diameter of the axle outside the bearing. Thus, the axle's diameter narrows at the point of passage through the bearings. This diameter differential together with the lock nuts 141 on the outer end of the axle serve to rigidly affix the axle to the bearings in the rear plate. The housing 131 additionally has a slot 143 therein in which a guide protrusion 145 affixed to the housing 129 slides. This serves to limit rotary motion between the housing 129 and outer casing 131 when the two are in slidable movement to each other. Surrounding the casing 131 is an outer race 147 separated from the casing 131 by a plurality of ball bearings 149. The outer end of the axles 121 protruding from the device have frusto-conically shaped rollers 151 rigidly secured thereto such that they will turn with the axle. The taper on the rollers 151 serves, as shown, to give a larger surface area contact between them and the tube 115 that is being tapered. Through the utilization of dotted lines, there is depicted the effect of the sliding movement of housing 131 to the front plate 111. In a rearward position it can be seen that the rollers 151 are not in contact with the tube due to enlarged diameter between them. However, as the housing 131 slides toward the front plate 111 the diameter between rollers 151 narrows to a point where compression upon the outer diameter of the tube occurs, resulting in a tapering thereof.

Referring now to FIG. 8 there is shown a view wherein six axles and rollers are shown. Six has been shown merely by way of example and it is quite feasible to use only three rollers displaced 120° apart from each other. A front U-shaped support structure 153 which is held by bolts 155 to the first outer race 123 of the front plate 111 maintains the race 123 in a stationary position while the rollers are rotating. This prevents the outer shell of the device from turning and serves to control its relative position. Additionally, there is disclosed a portion of a side support structure 157 having a vertical strut 159 and cylindrical tubes 161 between the strut 159 and the second outer race 147. The tube support contact 161 may be permanently affixed to the race 147 by welding or the like. The tube supports prevent rotation of the outer race and serve additionally to stabilize the positioning of the unit. As will be explained with reference to FIG. 11, axial movement of front plate 111 and housing 129 relative to casing 131 and rear plate 133 is effected by movement of support structure 153.

Referring now to FIGS. 9 and 10 there is shown a variation of the type of tapering device disclosed in FIG. 7. As can be seen the angular slot 163 causes the rollers to have a twisting motion relative to each other when they are at a point of narrowest diameter. FIG. 10 depicts the device of FIG. 9 wherein the rollers are in a retracted or open position prior to compression upon the tube. Thus, it can be seen by comparing FIGS. 9 and 10 that when the casing 131 moves relative to front plate 111 the rollers compress and twist relative to each other. In so twisting the rollers a greater surface contact can be had between the rollers and the tube passing therethrough.

FIGS. 11 and 12 depict a different type of roller head for the device of FIG. 7. The head 165 is rectangularly shaped and has a tapered groove 167 therein. FIG. 11 shows by way of example only three such heads which as previously explained appear to be the minimum required for successful operation of the device.

FIG. 13 is a simplified view of means for actuating the device of FIG. 7. The device would be generally incorporated on a movable carriage in the same manner as the device in FIG. 2 as shown in FIG. 1. The support 159 attached to the front plate 111 is connected to a worm screw 169 which can be manually operated by a hand cranked wheel 171. Support struts 173 are affixed to the back plate 133 on one end with the opposite end rigidly affixed to a rotatable pulley 175. The pulley can be driven by a conventional belt and motor which will cause rotation of the back plate 133 which in turn as can be seen from FIG. 7 causes rotation of housing 131. Additionally, the front face or plate 111 of the device is rotated due to the rotary action of the rollers 121 engaged with the plate. As can be seen both rear plate 133 and front plate 111 have to rotate in unison due to the inner connection of the axles 121.

Though the tube tapering devices of the invention have been described wherein the housings are rotated during the tapering operation, such is not always needed. As shown and described the tube tapering devices have rotated while the tube was in a static condition on the device described. As an alternate to this arrangement the chucks holding the tube could be rotated to thus rotate the tube being tapered while the tapering device does not rotate but just traverses the tube. The sole rotation of the tube will cause rotation of the lower elements in the tapering device due to contact therebetween so that effective tapering can transpire.

Although the invention has been described and illustrated in detail, it is to be clearly understood that the same is by way of illustration and example only and is not to be taken by way of limitation, the spirit and scope of this invention being limited only by the terms of the appended claims.

We claim:
1. A device for tapering tubes and similar items comprising;
 a first fixed plate having means forming a tube receiving aperture;
 a second movable plate having means forming a second tube receiving aperture aligned with said first aperture;
 a series of axles extending at least between said plates circumferentially about said apertures;
 a series of bearings circumferentially disposed in said plates and slidable with respect to their plates, said axles being journaled in their respective bearings in said first and second plates, the axles being fixed relative to their respective bearings in one of said plates and slideable with respect to their bearings in other of said plates;
 rollers disposed on said axles for compressing and deforming the tube as it is being tapered, the rollers defining a die orifice;
 means for applying axial tension to the tube as it is being tapered; and
 means to move the plates and adjust their relative positions wherein the die orifice is varied and the rollers are caused to deform the tube.
2. The device of claim 1 further comprising a housing joining said first and said second plates.
3. The device of claim 2 wherein one plate of said device is rigidly affixed to said housing with the opposite end in slidable engagement with said housing.
4. The device of claim 3 further including means for rotating said device about its axis.
5. The device of claim 4 wherein said means to move said plates relative to each other comprises means for rotating one plate relative to the other.
6. The structure according to claim 1 wherein the axles extending between the plates protrude outside of one of said plates and the rollers are disposed on the protruding portions of the axles.

7. The device of claim 6 further comprising means for rotating said movable plate relative to said fixed plate.

8. The device of claim 6 wherein the radial displacement of said axles circumferentially disposed about the aperture at the plate where said compressing means are disposed is less than at the opposite end of said device.

9. The device of claim 8 wherein said compressing means comprises frusto-conically shaped elements affixed to the protruding ends of said axles.

10. The device of claim 8 wherein a housing connects said first and second plates.

11. The device of claim 10 further including means for rotating said housing.

References Cited

UNITED STATES PATENTS

| | | | |
|---|---|---|---|
| 1,368,413 | 2/1921 | Stiefel | 72—78 |
| 2,341,144 | 2/1944 | Hill | 72—121 X |
| 2,410,052 | 10/1946 | Dewey | 72—120 X |
| 3,014,519 | 12/1961 | Wright | 72—78 |

CHARLES W. LANHAM, *Primary Examiner.*

K. C. DECKER, *Assistant Examiner.*